INVENTOR.
VINCENT C. HALL
BY
Campbell, Brumbaugh, Free & Graves
THEIR ATTORNEYS.

Oct. 9, 1956 V. C. HALL 2,766,319

METHOD OF AND APPARATUS FOR MAKING A BLACK PRINTER FOR FOUR-COLOR REPRODUCTION

Filed Sept. 16, 1952 2 Sheets-Sheet 2

INVENTOR.
VINCENT C. HALL

BY
Campbell, Brumbaugh, Free & Graves

THEIR ATTORNEYS.

United States Patent Office 2,766,319 Patented Oct. 9, 1956

2,766,319

METHOD OF AND APPARATUS FOR MAKING A BLACK PRINTER FOR FOUR-COLOR REPRODUCTION

Vincent C. Hall, Stamford, Conn., assignor to Time, Incorporated, New York, N. Y., a corporation of New York Application September 16, 1952, Serial No. 309,835

5 Claims. (Cl. 178—5.4)

The present invention relates to electro-optical production of a black printer for use in making four-color reproductions from a colored original. More particularly, the invention contemplates improving the tonal values in colored reproductions by modifying the highlight and shadow densities in a black printer.

Apparatus has previously been disclosed wherein an original color print or positive transparency is scanned by a light beam which analyzes the original in terms of its elemental areas. The light from each elemental area is split into three beams each of which passes through a filter transmitting a different primary color. The filtered beams impinge upon respective photosensitive devices which generate electrical signals having amplitudes representative of variations in the intensities of the three primary color components. These signals after amplification and considerable modification are used to control the intensities of reproducing light beams which scan in synchronism with the original scanning beam and expose sheets of photosensitive material which when developed provide the desired color separation negatives.

It is possible to reproduce within limits any color in the original by combining inks of the three subtractive primary colors, yellow, magenta and cyan. The only function served by the colored ink at a particular point on a plate corresponding to the least predominant subtractive primary color at that point of the original is to combine with equivalent amounts of the other two colored inks to form some shade of grey in the final color reproduction. It is consequently possible and, in fact, common to employ a fourth printing plate to print part or all of the greys and blacks in the original. Not only is it easier to produce a good black color with a black ink than by combining proper amounts of the three colored inks but the black ink is considerably less expensive.

In a four-color system, black ink and either two or all three of the three colored inks may be employed to reproduce a given elemental area of the original. This is accomplished by substituting black ink for all or a part of the ink that would otherwise have minimum density and by reducing the quantity of the other two colored inks by an amount equal, in first approximation, to the amount of the black ink.

In the highlight region of reproduction, there is a considerable range of colors in the original transparency which cannot be realized exactly with printing inks on paper because of the smaller hue and brightness range of the three colored inks. If sufficient masking is applied to result in printing the proper amount of two of the inks, the third color component, which controls the amount of the black ink, reduces the same to zero with the result that the black plate prints in practical printing processes only a uniform highlight dot. Since this third color often carries the apparent detail, no tonal gradation exists, and the print has a "flat" or characterless appearance.

In the shadow end of the scale, considerable areas of a normal transparency appear black or completely opaque when viewed in average illumination. However, the very strong light of the scanning beam analyzes the shadows in terms of actual color components. Since these deep shadows are in practice usually not ntutral but colored, at least one of the reproducing light beams will be considerably in excess of the minimum, and since the amount of black ink is controlled by this strongest color, the amount of black ink is less than the maximum and the printed result has a definite colored tone. In view of the limited range of brightness in available printing inks, it is necessary for the best reproduction that these areas be reproduced as dark grey or black.

In all color correction work and particularly in the black printer field, it is necessary to discuss both positives and negatives in some common terminology to cover phenomena which persist through various stages of a process. In a positive the highlights have a very low density and the shadows have a very high density, whereas the opposite is true in a negative. Thus all tones have a density greater than white in a positive and less than the density for white in a negative. All tones may be defined with reference to the tone for white. Those which differ least from the density for white constitute the highlights and those which differ most from the density for white constitute the shadows whether the record is a positive or a negative.

This same terminology lends itself particularly well to the discussion of electro-optical color reproduction processes in which the various color signals are effective according to their relative values rather than according to their absolute values. Again the signal representing the density for white is taken as the reference standard and all of the signals may be defined with reference to their difference from their signal for white. That is, in scanning an original positive or negative each color will produce certain red, green and blue signals and white will produce certain red, green and blue signals. For any one color, the important characteristic of the red signal, for example, is the difference between this red signal and the red signal for white. It is usual to think of a signal as relating to a negative when all of the values of the signal are equal to or greater than the corresponding signal for white, and to think of it as a positive when the maximum signal is that for white. Thus a light beam whose intensity is proportional to a positive signal will print a negative, and vice-versa.

One particularly pertinent use of this terminology is in connection with prior art electro-optical systems in which the above-discussed type of black printer is made. The black printer signal in this case is proportional to that one of the color printer signals which differs least from the corresponding signal for white.

It is an object of the present invention to increase the amount of black printed by the black printer in the highlight and shadow regions of the scale.

It is a further object of the invention to so modify the preparation of a black separation negative in a four-color reproduction system that the colored reproduction has a scale of apparent brightness more nearly corresponding to the original subject as viewed by the normal observer.

In order that the invention may be more fully understood it will now be described with reference to the accompanying drawings wherein:

Figure 1 is a schematic diagram of a portion of a typical color reproduction system embodying the improvements of the present invention; and Figures 2, 3 and 4 are graphs illustrating the theoretical principles on which the invention is based.

Referring now to Figure 1, there is shown a typical electronic color reproduction system for analyzing a positive color transparency in terms of additive primary colors and for exposing three color separation negatives and a black negative for use in preparing corresponding printing plates. A blue channel 11, a green channel 12 and a red channel 13 provide electrical output signals having amplitudes that are functionally dependent upon the intensities of the respective color components in the original transparency. Each of the channels 11, 12, and 13 ordinarily includes a pre-amplifier, a linear amplifier, a variable compressor and a mask modulator. The function of the amplifiers is to amplify the electrical signals generated by photosensitive devices in response to the scanning light beam. The compressors reduce the amplitude range of the signals sufficiently to take into account the limited amplitude capacities of the subsequent system. The mask modulators correct the relative amplitudes of the amplified and compressed signals to compensate for departures from the ideal in the spectral characteristics of the dyes employed in the original transparency, of the analyzing filters and of the printing inks.

Each of the signals from the channels 11, 12 and 13, preferably comprises an audio frequency carrier that is amplitude-modulated in accordance with the amplified, compressed and masked variations in the intensity of the corresponding color in the original transparency.

In order to allow for the addition of a black printer, the densities of the cyan, magenta and yellow negatives must be increased substantially in proportion to the reduction in the density of the black printer negative. In other words, as black ink is added in the final printing process, the colored ink must be removed since the black ink is substituted for at least a portion of the subtractive primary colored ink which would otherwise appear in the final reproduction with minimum intensity. This minimum intensity colored ink is represented by the maximum additive primary color signal appearing at the output of the channels 11, 12 and 13. This maximum signal is selected and employed to reduce the output signals from the channels to compensate these signals at least partially for the subsequent addition of the black printer.

For this purpose, conductors 14, 15 and 16 from the channels 11, 12 and 13, respectively, are connected to a maximum signal separator circuit 17 of a type known in the art. The maximum color signal selected by the separator circuit 17 is supplied to a compressor circuit 18 wherein amplitude of the signal is compressed by a desired factor, such as, for example, the square root of the applied voltage. The output voltage from the compressor 18 is applied as a modulating signal to balanced modulators 19, 21 and 22 to which modulators carrier signals from channels 11, 12 and 13, respectively, are supplied. The color signals are, accordingly, reduced by the modulators 19, 21 and 22 in accordance with a function of the black printer component.

The signals from the modulators 19, 21 and 22 are applied to respective amplifiers 23, 24 and 25 which increase the amplitude of the applied signals before rectification in rectifiers 26, 27 and 28, respectively. The rectifiers 26, 27 and 28 are connected by leads 29, 31 and 32, respectively, to a further maximum signal separator circuit 33. The output of separator 33 comprises the normal black printer signal which, after amplification in a direct voltage amplifier 34, may be applied through a switch 35 to a black glow lamp circuit 36 serving to expose the black printer negative in synchronism with the scanning of the original colored transparency. The yellow, magenta and cyan negatives are exposed by glow lamp circuits 37, 38 and 39 which are coupled by means of direct voltage amplifiers 41, 42 and 43, respectively, to the output circuits of the rectifiers 26, 27 and 28, respectively.

The circuits in Figure 1 described above form by themselves no part of the present invention and have previously been disclosed by the present applicant and William W. Moe in patent application Serial No. 14,008, filed March 10, 1948, and entitled "Method and Apparatus for Making Color Separation Negatives for Four Color Reproductions," now Patent No. 2,605,348. In order to provide more faithful reproduction in the highlight and shadow regions, a correction circuit 44 indicated within the dashed lines of Figure 1 is provided for modifying the normal black printer signal so as to give additional contrast in the highlight and shadow regions.

In a computer of the type illustrated in Figure 1, a suitable correction signal may be derived without alteration of the positive optical system of the scanner by selecting the maximum of the voltages which measure the transmission of the original in the three primary colors, taking into account the differences in the sensitivity of the eye to the different colors. Since the sensitivity of the eye is less in the blue and red regions, the voltages corresponding to the transmissions of these spectral regions must be reduced by substantially fixed ratios. Thereupon, three voltages may be obtained each representing the integrated light intensity in a certain spectral region adjusted for the integrated sensitivity of the eye in the same region. The correction signal is employed only in the highlight and shadow regions to modify the black printer.

Figure 3:
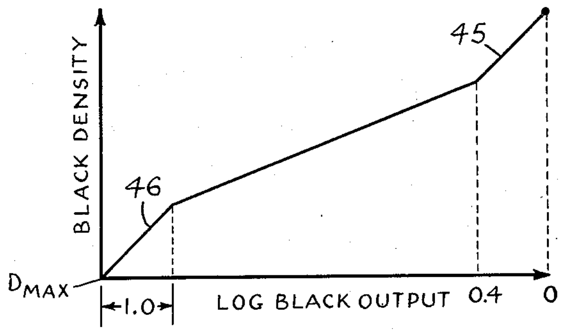
Figure 3 shows in idealized form, the desired increase in contrast in the highlight region 45 and the shadow region 46.

The characteristic curve of Figure 3 may be produced by adding a correction density to the normal black density in the shadow and highlight regions.

In the shadow region the added density, $\Delta D$, is proportional to the difference between the density being considered, $D_T$, and the maximum density of the transparency, $D_{max}$. Mathematically this is:

$$\Delta D=(D_{max}-D_T)K$$

the factor K depending on the amount of detail required in the shadows and on the characteristics of the black to which it is to be added. This added density is limited to a constant value over that part of the transparency density range lying between about 1.0 lower than the maximum density and about 0.4 greater than the minimum transparency density. In the highlight region the optimum value of K may be different from the value desirable for the shadow end of the tone scale.

Figure 1:
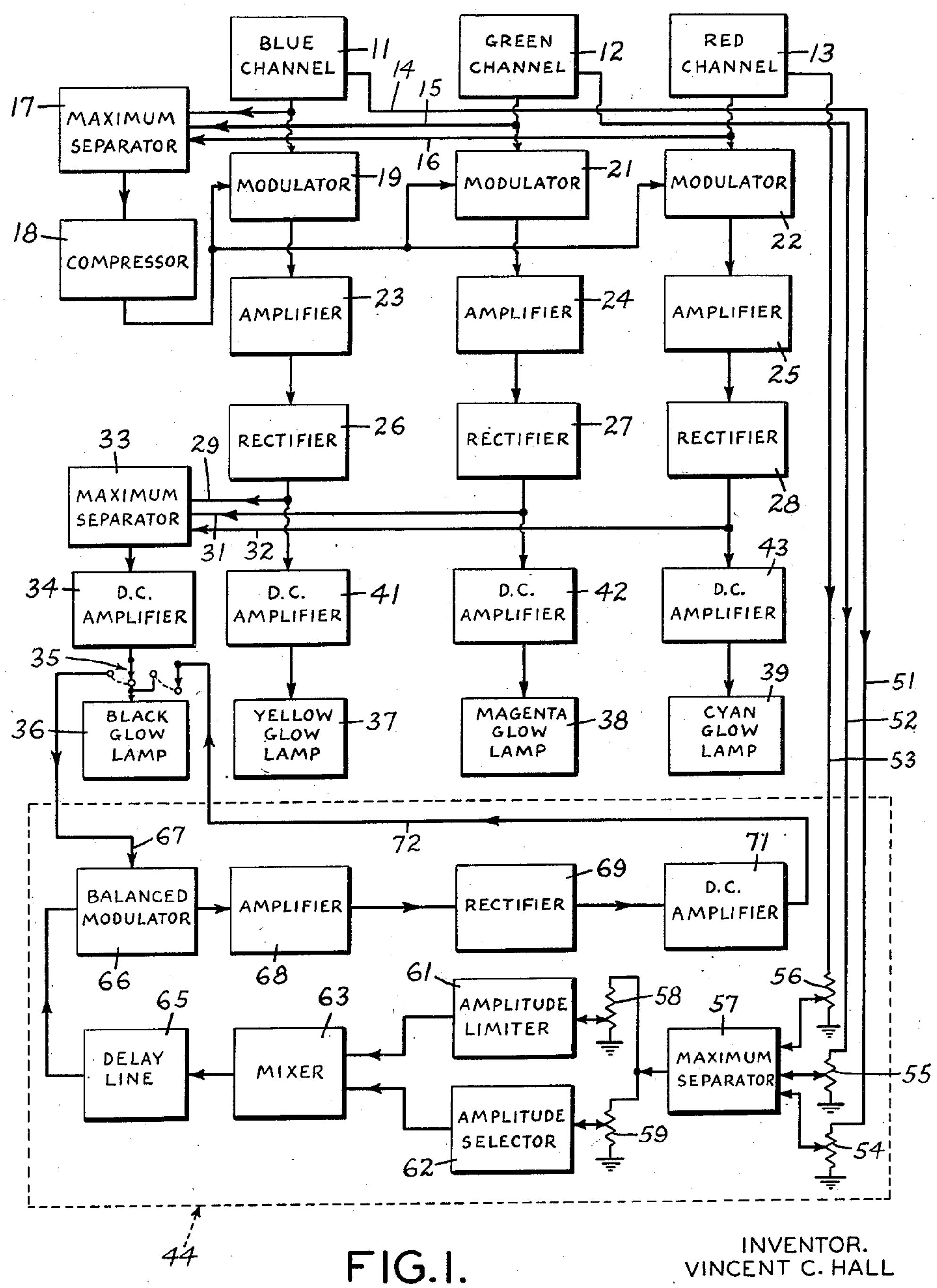
Figure 2:
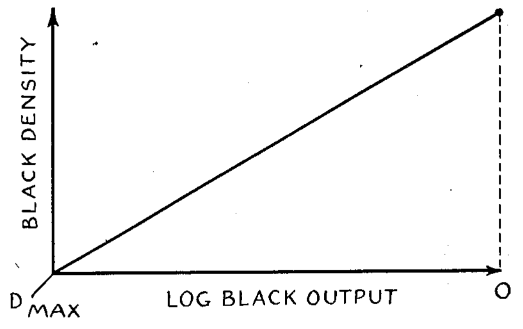
Figure 2 illustrates the density of the black printer negative as a function of the logarithm of the normal black signal. The slope of the linear portion of the curve, corresponding to the gamma of the negative, indicates a constant contrast.

The characteristic of the black printer shown in Figure 3 may be obtained by the correction circuit 44 in Figure 1. Conductors 51, 52 and 53 connect from the output of the preamplifiers in the channels 11, 12 and 13, respectively, to adjustable potentiometers 54, 55 and 56, respectively, in the circuit 44. The input signals for the correction circuit 44 may be derived from the compressors in the channels 11, 12 and 13. However, the input signals must be withdrawn from the channels before masking since the color signals in the regions where improvement is sought undergo considerable alteration in the mask modulators. The desired fraction of the color signal is supplied by each preamplifier to a maximum signal separator which applies the maximum of the signals to further adjustable potentiometers 58 and 59. Potentiometer 58 is located in the input circuit of an amplitude-limiter 61 which provides an output signal that reproduces the input signal up to but not exceeding a predetermined maximum amplitude. Potentiometer 59 forms a part of the input circuit of an amplitude-selector 62 which provides no output signal until the applied signal reaches a predetermined amplitude, after which the output signal abruptly increases.

Figure 4:
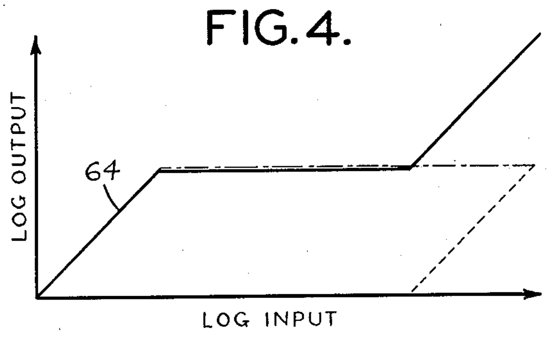

The output signals of the amplitude-limiter 61 and the amplitude-selector 62 are added in a mixer circuit 63 with the result that a combined signal is produced having an amplitude characteristic corresponding to the solid curve 64 shown in Figure 4. The signal appearing at the output of the mixer 63 is applied through a delay line 65 to a balanced modulator 66. The normal black signal is also supplied from the amplifier 34 to the modulator 66 when the switch 35 is thrown to the left position connecting the conductor 67 to the direct voltage amplifier 34. The modified black signal produced by the modulator 66 is amplified by an amplifier 68, rectified in a rectifier 69, further amplified as a direct voltage in an amplifier 71 and supplied over a conductor 72 to the black glow lamp circuit 36.

The balanced modulator 66 multiplies the normal black signal and the correction signal together effecting a strict addition of the normal and the correction densities when the gamma is unity. Irrespective of the gamma employed, the circuit elements which determine the shape of the amplitude characteristic may be so chosen that the relationship between the black density and the logarithm of the black output will be suitably modified.

Since various modifications may be made in the circuit arrangement of Figure 1, the illustrated embodiment of the invention is to be considered exemplary only and the invention is limited only by the scope of the appended claims.

I claim:

1. In apparatus for exposing a black printer emulsion wherein a normal black signal is generated in accordance with a function of the instantaneous color-corrected color signal that differs least from the corresponding signal for white of all the color signals employed to expose color separation emulsions, the combination of means for adjusting the amplitudes of the color signals in a predetermined ratio prior to color correction, means for selecting the adjusted color signal that differs least from the corresponding adjusted signal for white, means for distorting said selected signal to obtain a correction signal that is a desired function of said selected signal, means for multiplying said black signal and said correction signal to obtain a modified black signal, and means for exposing said black printer emulsion in accordance with said modified black signal.

2. In apparatus for exposing a black printer emulsion wherein a colored positive original is scanned to provide electrical signals representative of variations in three primary color components, respectively, the combination of means for continuously selecting the instantaneous signal corresponding to the least predominant subtractive primary in the original after color correction to provide a normal black signal, means for multiplying said normal black signal with a function of the instantaneous maximum of signals proportional to said electrical signals representative of variations in said three primary color components prior to color correction to increase reproduction of black in the highlight and shadow regions of the colored original and means for exposing the black printer emulsion in accordance with said modified black signal in synchronism with said colored original.

3. In apparatus for exposing a black printer emulsion wherein a black signal is generated in accordance with a function of the instantaneous color-corrected color signal that differs least from the corresponding signal for white of all the color signals employed to expose color separation emulsions, the combination comprising means for continuously selecting the instantaneous color signal prior to color correction that differs least from the corresponding signal for white, an amplitude limiter circuit for transmitting a first signal substantially proportional to said selected signal below a predetermined amplitude, an amplitude selector circuit for transmitting a second signal substantially proportional to said selected signal above a predetermined amplitude, a mixer circuit for adding together said first and said second signals to obtain a correction signal, a balanced modulator for multiplying said correction signal and said black signal to obtain a modified black signal, and means for exposing said black printer emulsion in accordance with said modified black signal.

4. In apparatus for exposing a black printer emulsion wherein a black signal is generated in accordance with a function of the instantaneous maximum of color-corrected color signals employed to expose color separation emulsions, the combination comprising a circuit for separating the instantaneous maximum of the color signals before color correction to obtain a selected signal, an amplitude limiter circuit for transmitting a first signal substantially proportional to said selected signal below a predetermined amplitude, an amplitude selector circuit for transmitting a second signal substantially proportional to said selected signal above a predetermined amplitude, a mixer circuit for adding together said first and said second signals to obtain a correction signal, a balanced modulator for multiplying said correction signal and said black signal to obtain a modified black signal, and means for exposing said black printer emulsion in accordance with said modified black signal.

5. Black signal apparatus for a color reproduction system wherein a plurality of color analyzing light beams are derived by scanning elemental areas of a multicolor original, and wherein photosensitive devices respectively respond to said light beams to transmit a plurality of electrical color signals through separate color channels to respective exposing devices which produce color separations, said apparatus comprising, a signal selector circuit connected to receive inputs of said color signals from said channels and to transmit through a black signal channel a normal black signal derived from the received color signal representing the light beam of relatively greatest intensity, exposure means connected in said last-named channel beyond said circuit to be excited by the black signal transmitted through said black channel, and to responsively expose a black separation in synchronism with the scanning of said original such that the black separation density varies from area to area of said separation as a logarithmic function of the concomitant amplitude variation of the normal black signal, and an amplitude selective distortion circuit connected in said black signal channel between said selector circuit and said exposure means to distort amplitudes of said normal black signal when the same is derived from an original color having an intensity at one end of the intensity scale, said distorted black signal exciting said exposure means to provide different first derivative values of said logarithmic function in the respective regions where said normal black signal is distorted and is undistorted.

References Cited in the file of this patent

UNITED STATES PATENTS

| | | |
|---|---|---|
| 2,253,086 | Murray | Aug. 19, 1941 |
| 2,413,706 | Sunderson | Jan. 7, 1947 |
| 2,492,926 | Valensi | Dec. 27, 1949 |
| 2,605,348 | Hall | July 29, 1952 |